United States Patent [19]

Giannuzzi

[11] Patent Number: 4,616,968
[45] Date of Patent: Oct. 14, 1986

[54] NON-ROTATING TOGGLE BOLT ASSEMBLY

[76] Inventor: Louis N. Giannuzzi, 4 Shelter Dr., Cos Cob, Conn. 06807

[21] Appl. No.: 635,068

[22] Filed: Jul. 27, 1984

[51] Int. Cl.⁴ ............................................. F16B 21/00
[52] U.S. Cl. .................................................... 411/342
[58] Field of Search ............... 411/342, 341, 340, 343, 411/344, 345, 346, 15

[56] References Cited

U.S. PATENT DOCUMENTS

| | | | |
|---|---|---|---|
| 1,228,512 | 6/1917 | Zifferer | 411/346 |
| 1,373,188 | 3/1921 | Goewey | 411/342 |
| 1,600,034 | 9/1926 | Brenizer | 411/346 |
| 2,061,634 | 11/1936 | Pleister | 411/342 |
| 2,616,327 | 11/1952 | Karitzky | 411/346 |
| 3,302,508 | 2/1967 | Topf | 411/341 |
| 3,389,631 | 6/1968 | Vaillancourt | 411/346 |
| 3,513,746 | 5/1970 | Forsberg | 411/346 |
| 4,079,655 | 3/1978 | Roberson | 411/344 |
| 4,286,497 | 9/1981 | Shamah | 411/342 |

FOREIGN PATENT DOCUMENTS 1237386 3/1967 Fed. Rep. of Germany ...... 411/342

Primary Examiner—Gary L. Smith
Assistant Examiner—Adrian H. Whitcomb, Jr.
Attorney, Agent, or Firm—Michael Ebert

[57] ABSTRACT

A non-rotating toggle bolt assembly in which a trunnion nut received on the end of a screw whose length exceeds the thickness of the hollow wall for which the assembly is intended, pivotally supports a pair of spring-biased toggle wings. The wings are normally outstretched; but when the assembly is pushed through a hole drilled in the wall, the wings then fold in against the screw to permit passage therethrough. On emerging from the hole, the pivoting wings resume their outstretched state at a position well displaced from the inner surface of the wall. Included in the assembly are locking means which act to prevent rotation of the outstretched wings when, in the course of installation, the operator turns the screw to advance the toggle axially toward the inner surface of the wall to tighten the assembly, and which also acts to prevent loosening of the assembly such as might be caused by vibration, after such installation.

9 Claims, 9 Drawing Figures

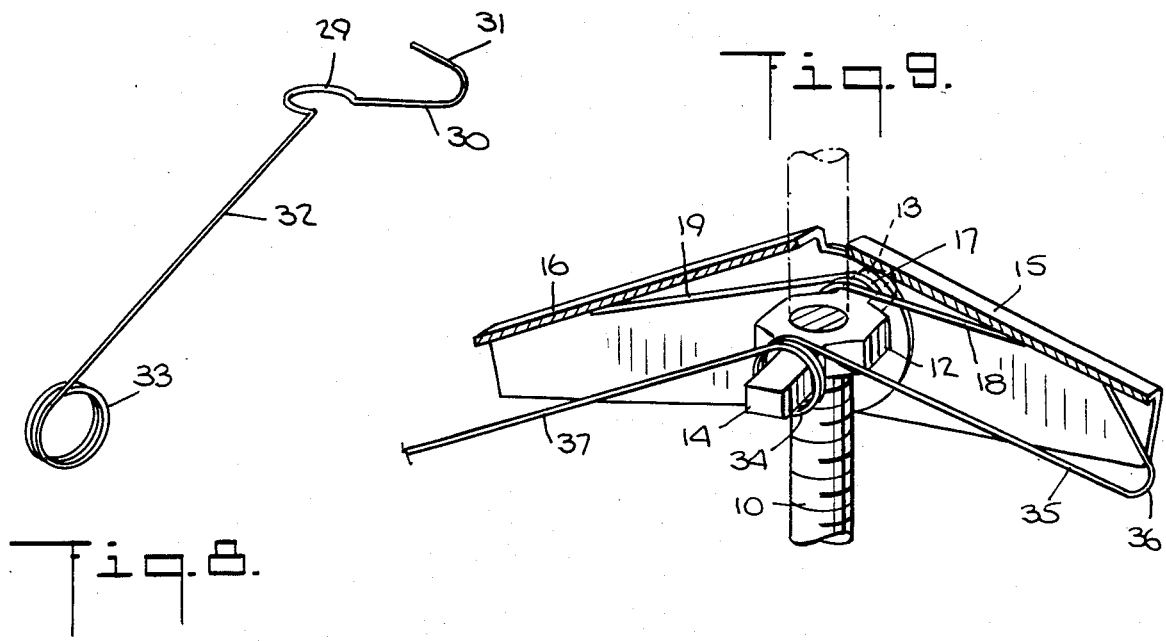
Fig. 8.
Fig. 9.
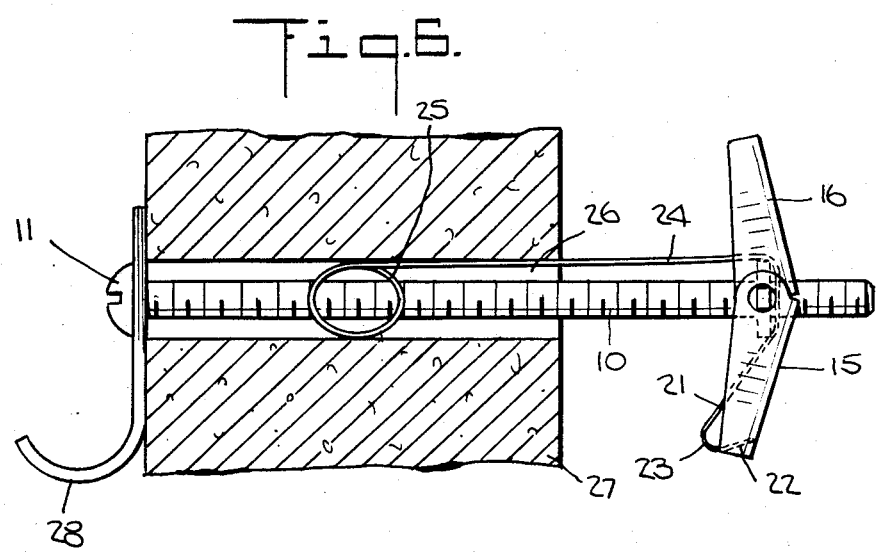
Fig. 6.
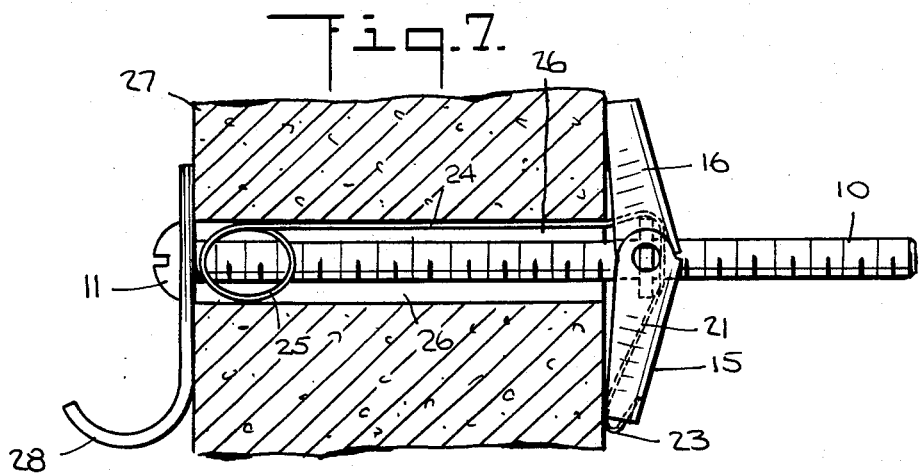
Fig. 7.

NON-ROTATING TOGGLE BOLT ASSEMBLY

BACKGROUND OF INVENTION

1. Field of Invention

This invention relates generally to toggle bolts which are insertable in a hole drilled in a hollow wall, and more particularly to a toggle bolt assembly including locking means that act to prevent rotation of the toggle wings in the course of installation when the bolt is turned to axially advance the trunnion nut on which the wings are pivoted toward the inner surface of the wall, and which additionally later act to prevent loosening of the assembly due to vibration after such installation.

2. Prior Art

Toggle bolts are commonly used to secure fixtures and other objects against the outer surface of a hollow wall formed of masonry, tile, cinder block, plaster or fiber board or any other existing wall material capable of supporting a load. The conventional toggle bolt assembly consists of a threaded bolt or screw on which is received a nut provided with opposed lugs or trunnions to pivotally support a pair of spring-biased wings. The wings, which are normally outstretched, fold in against the bolt when it is inserted in a drilled hole in the wall, the hole diameter being large enough to accommodate the folded-in wings. Toggle bolts are available in various sizes and weights, depending on the loads they are intended to support on a wall.

When installing a conventional toggle bolt in a hollow wall to hold a fixture or other object against its outer surface, a hole is first drilled in the wall, the diameter of the hole depending on the gauge of the toggle bolt. The toggle bolt assembly is inserted through a mounting hole in the fixture and pushed into the wall hole, the wings folding in to permit such entry. The length of the bolt is greater than the combined thickness of the fixture, the wall and the folded-in toggle wings. Hence the wings pivoted on the nut, which is initially near the end of the bolt, resume their outstretched state when the bolt is fully inserted. The outstretched wings are thus displaced a substantial distance from the inner surface of the wall. The extent of this displacement depends on the length of the bolt relative to said combined thickness.

It is not at this point possible to tighten the wall-inserted toggle bolt; for should one turn the screw with a screw driver, the wings, which are free, will also turn and the trunnion nut will not advance on the screw toward the inner surface of the wall. In order, therefore, to effect tightening with a conventional toggle bolt, the installer must pull the fixture away from the wall to cause the outstretched wings to engage the inner surface of the wall and thereby resist a turning action. In this way, the screw can be turned with a screw driver without at the same time turning the wings, and the nut will then advance on the screw to effect tightening of the toggle bolt.

In practice, the need to manually pull the fixture away from the wall in order to tighten the toggle bolt will in many instances present serious difficulties. For example, if panels of insulation material are to be fastened to a hollow roof by means of roofing plates, the installer for each such plate must insert the toggle bolt through a mounting hole in the plate and thread the screw into the trunnion nut. A hole in the insulation panel and a hole in the roof are then made. The screw carrying the toggle wings is inserted through the panel and roof holes; and the wings then assume their outstretched state at a position displaced from the inner surface of the roof.

In order to now tighten the anchor bolt, the installer must place his fingers beneath the roofing plate so as to pull the roofing plate away from the insulation panel lying on the roof until the wings then engage the inner surface of the roof thereby preventing rotation of the wings to permit tightening of the toggle bolt.

Most professional installers now use electric screw drivers which to be rendered operative must be pressed against the head of the screw. This presents no difficulty when the screw head lies against a stable substrate. But if the head of the screw lies against a roofing plate being held in one hand by the installer while his other hand holds the electric screw driver, the inherent instability of the situation makes installations very difficult and dangerous.

One must bear in mind that a professional installer is required in the case of a typical roof installation to put in thousands of toggle bolts, and that with conventional toggle bolts, the need to pull up the roofing plate in order to tighten the bolt not only adds significantly to the time it takes to make the installation, but also increases the risk of crushed fingers or other mishap.

Moreover, in a roof installation in which the insulation panels are secured by toggle bolts, the toggle bolts are vertically disposed; and since the exposed roof is subject to vibratory and compressive forces, this causes the toggle wings to actually unscrew to a point where the wings will fall off the screw, thereby leaving the insulation panels unsecured. As a consequence, the panels may be blown off the roof in a high wind producing a strong updraft.

The following patents which deal with various forms of toggle bolts are of background interest:

| | |
|---|---|
| Karitzky | 2,616,327 |
| Pleister | 2,061,634 |
| Gelpcke | 2,398,220 |
| Shamah | 4,286,497 |
| Apelzweig | 2,998,743 |
| Gelpcke | 2,567,372 |

SUMMARY OF INVENTION

In view of the foregoing, the main object of this invention is to provide a non-rotating toggle bolt assembly adapted to fasten a fixture or other object to a hollow wall, which assembly, after insertion in a hole drilled in the wall, may be tightened by a screw driver without the need to pull the fixture away from the wall, thereby making the installation procedure faster and safer.

More specifically, an object of the invention is to provide a toggle bolt assembly that includes locking means that act to prevent rotation of the outstretched toggle wings in the course of installation when the screw is turned in to advance the toggle to tighten the anchor bolt on the wall, and which also later act to prevent vibration from loosening the assembly after such installation.

Still another object of the invention is to provide a toggle bolt assembly whose locking means, which may be fabricated of resilient metal or plastic material, are easily combined with the standard elements of the toggle whereby the resultant assembly is not significantly more costly to manufacture than a conventional assembly.

Briefly stated, these objects are accomplished in a non-rotating toggle bolt assembly having a nut provided with opposed trunnions to pivotally support a pair of wings, the nut being received on a screw. Encircling one trunnion is the coil of a biasing spring whose straight ends extend under the wings to normally maintain them in an outstretched state.

The assembly includes locking means which in one preferred embodiment takes the form of a locking spring having a mounting coil which encircles the other trunnion, the coil having on one end thereof a long tail which extends under its related wing and well therebeyond to terminate in a compressible loop. On the other end of the mounting coil is a short tail which extends under its related wing and terminates in a compressible crook whose peak projects outwardly from this wing.

As the assembly is being pushed into a hole drilled in a wall, the spring-biased wings fold in, and in doing so fold in the long and short tails, both of which enter the hole. When the wings emerge from the hole, they pivot to resume their outstretched state at a position well displaced from the inner surface of the wall. The short tail also leaves the hole to resume its normal position under its related wing. But the long tail, because of its length, remains in the hole. The compressible loop of the long tail has a diameter greater than the hole diameter and is compressed in the hole to be held therein. As a consequence, the long tail held in the hole and coupled to the trunnion nut acts to prevent rotation of the wings as the screw is turned in by the operator to axially advance the toggle and thereby tighten the assembly on the wall.

When the wings are brought by the advancing nut against the inner surface of the wall, the wing overlying the crook of the short tail then presses the peak thereof against the surface, to deform the crook and thereby impose an off-center pressure against the wings which prevents loosening of the wings or the screw.

OUTLINE OF DRAWINGS

For a better understanding of the invention as well as other objects and further features thereof, reference is made to the following detailed description to be read in conjunction with the accompanying drawings, wherein:

FIG. 6 shows how the assembly is pushed into the wall hole;

FIG. 7 shows how the assembly in the hole is tightened;

FIG. 8 shows a modified form of the locking spring; and

FIG. 9 shows another embodiment of the assembly.

DETAILED DESCRIPTION

Figure 1:
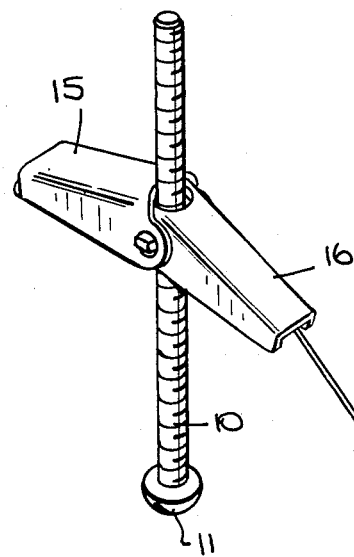
FIG. 1 is a perspective view of a first preferred embodiment of a locking toggle bolt assembly in accordance with the invention.

First Embodiment:

In FIGS. 1 to 5, there is shown a locking toggle bolt assembly according to the invention, including a threaded bolt or screw 10 having a slotted head 11 adapted to receive the blade of a screw driver. The length of the screw shank exceeds the thickness of the hollow wall for which the toggle bolt is intended. Threadably received on the end of the screw shank is a nut 12 provided with oppositely-projecting lugs 13 and 14. These form trunnion to pivotally support inner and outer foldable wings 15 and 16, the inner wing folding into the outer wing.

Wings 15 and 16 have a channel-shaped cross section and are provided at their adjacent edges with complementary arcuate cut-outs to define an opening to admit the shank of the screw. These cut-outs form a pair of shoulder abutments that limit the extent to which the wings may be folded out.

Figure 3:
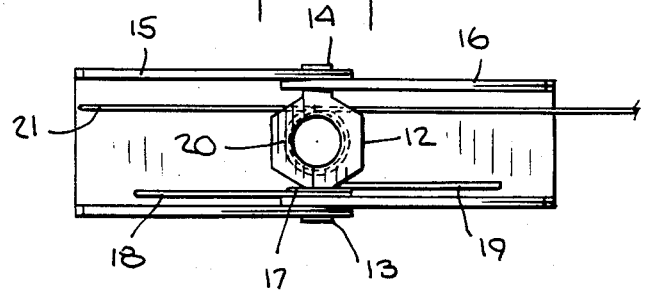
FIG. 3 is a bottom view of the spring-biased wings pivoted on the trunnion nut.
Figure 2:
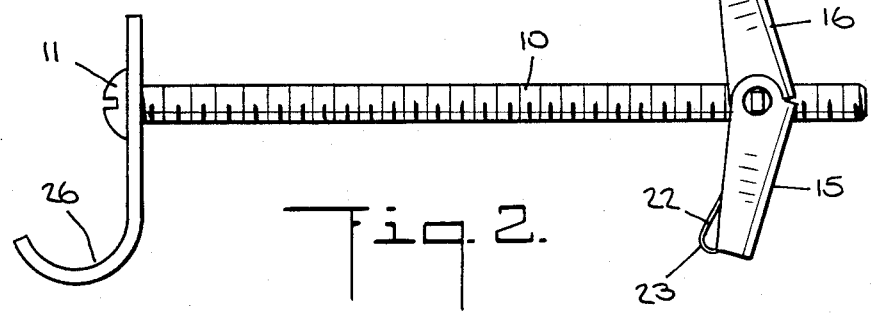
FIG. 2 is an elevational view showing the assembly and a fixture to be fastened thereby.

As shown in FIG. 3, encircling trunnion 13 is the coil 17 of a biasing spring whose straight wire ends 18 and 19 extend under wings 15 and 16, respectively, and act to normally maintain the wings in an outstretched state. The wings are foldable in toward screw 10 against the tension of the biasing spring; and when the folded-in wings are released, they spring out to resume their normal outstretched state.

Also included is a locking means in the form of a mounting coil 20 of spring wire placed between nut 12 and the screw opening in wings 15 and 16, the diameter of the coil being slightly larger than that of the screw to permit it to pass through this coil.

Extending from one end of mounting coil 20 is a short wire tail 21 which runs under wing 15 and terminates in a compressible crook 22. Crook 22 has a peak 23 which projects from the rear of the wing in the direction of the inner surface of the wall. This curved bend or crook whose tip lies against the base of wing 15 functions as one operative component of the locking means associated with the toggle bolt assembly.

Extending from the other end of mounting coil 20 is a long wire tail 24 which runs under wing 16 and well therebeyond to terminate in a compressible loop 25, which may have more than one turn. This loop acts as the second operative component of the locking means. The locking spring may be fabricated of high strength metallic spring wire or synthetic plastic material having comparable properties. The wings, the screw and the wing-biasing spring may be made of the same metals commonly used in conventional toggle bolts and be fabricated in a range of sizes and weights, depending on the thickness of the walls for which they are intended as well as on the intended loads to be supported on these walls.

When the locking bolt assembly is to be installed by an operator in a hole 26 drilled in a hollow wall 27 of masonry or other wall material capable of supporting the intended load for this purpose of securing a load-holding fixture 28 or other object to the outer surface of the wall, in order to prepare for installation, the operator first passes the screw through the mounting hole in the fixture and then turns the trunnion nut onto the end of the screw shank. At this point, the arrangement is that shown in FIG. 2, where it will be seen that wings 15 and 16 and the long and short tails 21 and 24 are outstretched.

The operator then pushes the assembly through the drilled hole 26 in a hollow wall 27. This action causes the pivoted wings and the related tails to fold in to permit passage through the hole whose diameter is large enough to accommodate the assembly in the folded-in state. Hence before the wings emerge from the hole in the wall, both tails are also disposed within the hole.

When, however, as shown in FIG. 6, the wings emerge from the drilled hole 26 and pivot to resume their normal outstretched state, and the screw is then fully inserted so that now fixture 28 lies against the outer surface of wall 27, the wings are then well displaced from the inner surface of the wall. The short tail 21 is then also outside of the hole and lies under the inner wing 15. But the long tail 24 and its compressible end loop 25, because of the length of this tail, remain in the hole. The diameter of loop 25 is somewhat greater than that of the hole and is therefore compressed thereby to provide a tail restraining force.

In practice, loop 25 of the long tail may encircle screw 10 or lie outside the screw, but in both cases, the screw and the loop are disposed within the masonary hole.

When, therefore, the operator using a screw driver now turns screw 10, the trunnion nut 12 and the wings 15 and 16, which are prevented from rotating by reason of the locking action of the long tail, advance axially on the screw toward the inner surface of hollow wall 27. As shown in FIG. 7, the wings then approach engagement with this wall surface. The operator continues to turn the screw to tighten the assembly, and in doing so, the peak 23 of the crook 22 on short tail 21 which engages the inner wall surface is subjected to pressure which deforms the crook to produce an off-center locking force on the wings which prevents the wings and the screw from subsequently turning as a result of vibratory or other forces imposed on the wall which would otherwise tend to loosen the assembly.

Thus the locking spring has a dual function; for it not only serves to prevent turning of the wings when the screw is turned by the operator, thereby doing away with the need during the installation procedure to pull the fixture away from the wall as in prior art toggle bolts, but it also serves to prevent subsequent unscrewing of the screw or the wings and the consequent loosening of the installed assembly.

Figure 4:
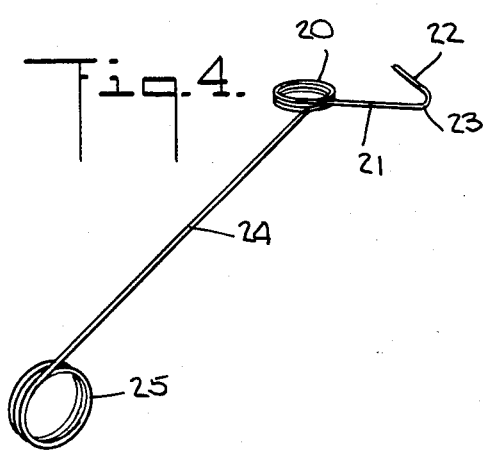
FIG. 4 is a separate view of the locking spring.

Other Embodiments:

In the locking spring shown in FIG. 8, instead of a mounting coil, as in FIG. 4, through which the screw is admitted to retain the spring on the sub-assembly, use may be made of a half loop 29 for this purpose. A short tail 30 extends from one end of the half-loop, terminating in a compressible crook 31, and a long tail 32 extends from the other end, terminating in a compressible loop 33.

Figure 5:
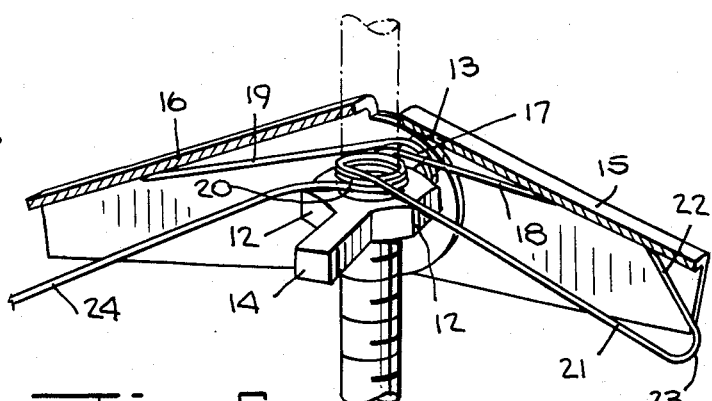
FIG. 5 shows the relationship of the locking spring to the biasing spring.

But whether the locking spring is of the type shown in FIG. 4 or in FIG. 8, this element has to be added to the wing sub-assembly after screw 10 is inserted in the mounting hole of the fixture. The operator is then required to place the mounting coil or the half loop of the locking spring at a position overlying the wing nut intermediate the nut and the opening between the wings so that the screw can be advanced therethrough, as shown in FIG. 5.

In the form of locking spring shown in FIG. 9, the coil 34 is adapted to fit onto trunnion 14 of the nut 12 whose other trunnion 13 carries the mounting coil 17 of the wing-biasing spring. Thus, the locking spring becomes a part of the wing sub-assembly and does not have to be added thereto prior to installation of the assembly in a drilled hole. Extending from one end of coil 34 is a short tail 35 terminating in a compressible crook 36. Extending from the other end of coil 34 is a long tail 37, terminating in a compressible coil which acts to retain this tail in the hole.

One can further simplify the sub-assembly by dispensing with the biasing spring (17,18,19), for the long and short tails of the locking spring which run under the inner and outer wings also perform a biasing function to fold out these wings. Also, one may dispense with the short tail and its function, and provide a rotation preventing means in the form of a resilient plastic tail of flat ribbon material having an eye at one end to couple the tail onto the screw between the trunnion nut and the wings, and having at the other end a compressible ring or bend, whose function is the same as the long tail previously described.

While there have been shown and described preferred embodiments of a locking toggle bolt assembly in accordance with the invention, it will be appreciated that many changes and modifications may be made therein without, however, departing from the essential spirit thereof.

Thus one can modify the existing wing-biasing spring on a standard toggle bolt so that the end of the wire of the spring which lies under one wing is formed into a compressible crook serving a function similar to the short tail previously described to prevent loosening of the installed toggle as a result of vibration. In this way, one does away with the need for a separate short tail.

The invention is also applicable to toggle bolts of the so-called gravity or tumble type in which a single wing member is pivoted off-center on the trunnion nut so that after the toggle is inserted through a wall hole, gravity causes the off-center wing member to swing to a vertical position. In order to prevent rotation of the trunnion nut while the bolt is turned to draw the wing member toward the wall, a long spring tail is provided which is linked at one end to the trunnion nut, the other end having a compressible loop therein which is held within the wall hole to prevent rotation of the nut in the manner previously described.

I claim:

1. A non-rotating toggle bolt assembly for supporting a fixture or other object against the outer surface of a hollow wall, said assembly comprising:

A. a screw having a head engageable by a screw driver or other tool to effect turning, and a threaded shank whose length exceeds the thickness of the wall for which it is intended;

B. a nut threadably received on the shank and provided with oppositely-extending lugs forming trunnions;

C. wings pivotally supported on said trunnions and spring-biased to normally maintain the wings in an outstretched state, said wings having an opening therein to admit the shank, said wings in the course of installation folding in toward the shank to permit passage of the assembly in a hole drilled in said wall, the wings when emerging from the hole resuming their outstretched state; and D. locking means to prevent rotation of the outstretched wings, whereby when said screw is turned, the nut and the wings pivoted on said trunnions will then advance along the shank toward the inner surface of the wall to engage said inner surface, said locking means being constituted by a locking member coupled to said nut and the wings pivoted on said trunnions and provided with a long tail which terminates in a restraining element, the length of the long tail substantially exceeding the length of the folded-in wings and being such that in the course of installation when the wings are folded in to pass through the hole, the long tail also passes therethrough but the restraining element does not emerge from the hole when the wings after emerging from the hole resume their outstretched state and the head of the screw then lies against the fixture on the outer surface of the wall whereby the restraining element restrains the long tail, thereby preventing rotation of the nut and the wings pivoted on the trunnions, said locking means being formed of resilient metal wire.

2. An assembly as set forth in claim 1, further including protective means which are operative when the outstretched wings are tightened against the inner surface of the wall to resist unscrewing of the wings and of the screw, thereby preventing loosening of the installed assembly.

3. An assembly as set forth in claim 2, wherein said protective means is constituted by a protective member coupled to said nut and provided with a short tail which runs under one of the wings to terminate in a compressible element, whereby in the course of installation when the wings are folded in to go through the hole, this action also folds in the short tail which also goes through the hole, the length of the short tail being such that when the head of the screw lies against the fixture on the outer surface of the wall, the outer wings and the short tail are then outstretched, the compressible element of the short tail being pressed between its related wing and the inner surface of the wall when the wings are tightened to thereby apply a pressure on the nut to resist subsequent loosening of the wings and the screw.

4. An assembly as set forth in claim 1, wherein the restraining element of the long tail is a compressible loop.

5. An assembly as set forth in claim 3, wherein the compressible element on the short tail is a crook.

6. An assembly means as set forth in claim 1, wherein said locking means includes a mounting eye from which said long tail extends, said eye being disposed between said nut and said wing opening and having a diameter which admits said screw.

7. An assembly as set forth in claim 1, wherein said locking means includes a mounting eye from which extends said long tail, said eye encircling one of said trunnions.

8. An assembly as set forth in claim 7, wherein said wings are biased by a biasing spring having a mounting coil encircling the other trunnion.

9. An assembly as set forth in claim 2, wherein said protective means is formed of resilient metal.

* * * * *